March 3, 1970 E. M. ALLEN 3,498,757
PROCESS FOR CONVEYING GASES CONTAINING SUSPENDED SOLIDS
Filed July 27, 1967 2 Sheets-Sheet 1

INVENTOR
EDWARD M. ALLEN
BY
ATTORNEYS

United States Patent Office 3,498,757
Patented Mar. 3, 1970

3,498,757
PROCESS FOR CONVEYING GASES CONTAINING SUSPENDED SOLIDS
Edward M. Allen, Doylestown, Ohio, assignor to PPG Industries, Inc., a corporation of Pennsylvania
Continuation-in-part of application Ser. No. 382,095, July 13, 1964. This application July 27, 1967, Ser. No. 656,521
Int. Cl. B65g *53/04;* C01g *23/04*
U.S. Cl. 23—293
10 Claims

ABSTRACT OF THE DISCLOSURE

Metal oxides, e.g., titanium dioxide, are prepared by vapor phase oxidation of the corresponding metal halides, e.g., titanium tetrahalide, in a reaction chamber at elevated temperatures. Gaseous suspensions of the metal oxide are withdrawn from the reaction chamber and introduced into a conduit where, optionally, cooling can be accomplished. Deposition of the metal oxide in the conduit is avoided by utilizing mass velocities of at least 30,000 lbs./hr./ft.$^2$ and solids loading of from 0.1 to 0.5 pound of solid per pound of gas.

CROSS-REFERENCE TO RELATED APPLICATIONS

This application is a continuation-in-part of U.S. Ser. No. 382,095, filed July 13, 1964, now abandoned, in the name of Edward M. Allen.

BACKGROUND OF THE INVENTION

In the production of metal oxide by vapor phase oxidation of corresponding metal halide in a reaction chamber, the products of the vapor phase oxidation issue from the reaction chamber in the form of a finely-divided solid metal oxide suspended in large volumes of hot, corrosive, halogen-containing gases. The cooling of such a product stream to a temperature at which conventional processing equipment can easily handle the finely-divided metal oxide and halogen-containing gases has been troublesome because of the highly corrosive nature of the product stream and its typically high temperatures.

One method suggested for cooling the products of vapor phase oxidation of metal halides has been to admix halogen-containing product gases that have been cooled and substantially freed of their solids burden with the product stream. See, for example, U.S. Patents 2,508,272 and 2,657,979. In addition, the use of cooler halogen gas has been suggested for use as a direct cooling agent. See U.S. Patent 2,791,490. In utilizing the aforementioned methods of direct heat exchange, it is necessary to provide some form of equipment to receive the reactor product effluent and cooler gases admixed therewith. Such equipment typically is some form of conduit through which the mixture of gases is conveyed. One disadvantage to the aforementioned cooling process is that a large volume of cool gas must be handled in order to cool a relatively small quantity of finely-divided solids and avoid deposition of the finely-divided solids within the conduit. Typically, solids loading of less than 0.1 pound of solid per pound of gas, e.g., 0.05 pound of solid per pound of gas, has been used to avoid depositing the suspended solids in the conduit. Handling and processing of such large volumes of gas is costly and produces a heavy cost burden on the entire process.

In order to avoid the economic burden of handling large volumes of gas in comparison to the amount of finely-divided solids contained therein, the solids loading, i.e., the pounds of solid per pound of gas ratio, should be increased. However, when this ratio is increased to levels above that mentioned hereinabove, i.e., 0.1, the solids tend to deposit out of suspension and coat the surface of the conduit through which it is being conveyed. Since finely-divided metal oxides, such as titanium dioxide, are typically poor conductors of heat, poor heat transfer coefficients result when indirect heat exchange means are employed to supplement direct heat exchange methods. In addition, the deposition of the finely-divided solids can become so great that plugging of the conduit can occur which results in a shutdown of the entire process. In order to avoid deposition of such finely-divided solids and plugging of the conduit, it has been suggested that cold, solid, abrative particles be added to the gaseous product stream prior to and during its passage through the conduit in order to scrub the walls of the conduit and remove plugs forming therein. See, for example, U.S. Patents 2,721,626; 2,789,886; and 2,899,278. The procedures described in the aforementioned patents add an additional cost to the entire process because of the added cost of the abrative solids and, when necessary, the cost of separating such particles from the solid metal oxide product.

BRIEF SUMMARY OF THE INVENTION

It has now been found that finely-divided metal oxide suspended in a gaseous stream can be conveyed through a conduit at more economic solids loading levels and without the need for added abrative solids by selecting a conduit size and gaseous flow rate such that the mass velocity of the gaseous stream containing the suspended solids through the conduit is at least about 30,000 pounds per hour per square foot (lbs./hr./ft.$^2$). In addition, it has been found that solids loading of from about 0.1 to about 0.5 pound of solid per pound of gas can be maintained at such mass velocities without significant deposition of the conveyed solids in the conduit and without plugging of the conduit.

In another embodiment of the present invention, the mass velocity and solids loading of the gaseous product stream conveyed through the conduit is obtained by merging an auxiliary gas stream of desired quantity and velocity with the gaseous product effluent stream to provide the resulting combined stream with a mass velocity of at least about 30,000 pounds per hour per square foot and solids loading of from about 0.1 to about 0.5 pound of solid per pound of gas.

In still another embodiment of the present invention, the conduit employed to convey the gaseous product stream is a conventional heat exchanger, such as a tubular cooler, that employs gaseous or liquid coolants for passage in indirect heat exchange relationship with the gaseous solid suspension being conveyed.

DETAILED DESCRIPTION

Figure 1:
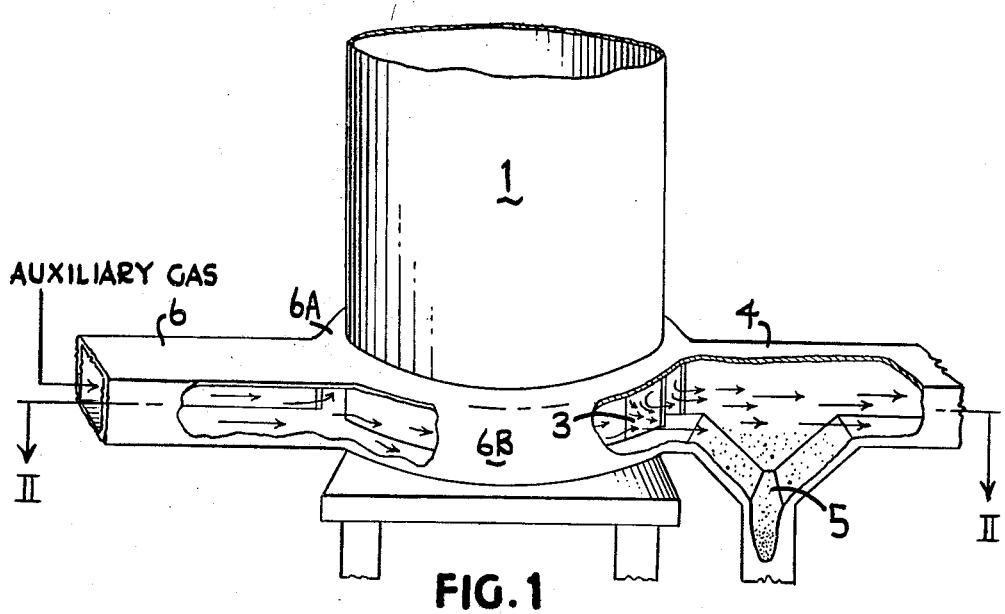
FIGURE 1 represents a three-dimensional view of the lower portion of a cylindrical reactor to which is affixed conduit means for conveying reactor effluent from the reactor and for admixing auxiliary gas with the product effluent.

In the production of metal oxides by vapor phase oxidation of one or more metal halides, either in the presence or absence of a fluidized bed, metal halide is oxidized by reaction in the vapor phase with an oxygen-containing gas in a reaction chamber maintained at a temperature at which the metal halide and oxygen react. When the reactants are, for example, titanium tetrachloride and oxygen, the temperature of the reaction zone is above about 500° C. and can range from 700° C. to about 1600° C. Typically, the reaction is conducted at temperatures of from 800° C. to 1200° C., usually 900° C. to about 1100° C. An effluent product stream comprising finely-divided solid metal oxides suspended in large volumes of hot corrosive halogen-containing gases is withdrawn from the reaction chamber and such product stream is conventionally cooled prior to further processing. In the preparation of pigmentary metal oxides, and especially pigmentary white metal oxides, such as titanium dioxide, the cooling of the product effluent stream should be performed without causing incorporation of impurities which can degrade the color of the metal oxide produced.

The term "metal," as employed herein, is intended to mean and include those elements exhibiting metal-like properties including the metalloids. Examples, by way of illustration, of pigmentary metal oxides which can be produced by vapor phase oxidation of the corresponding metal halide are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, titanium, ytterium, ytterbium, zinc zirconium, niobium, gallium, antimony, lead, and mercury. Any suitable halide of the corresponding metals, i.e., the chlorides, bromides, fluorides, and iodides, can be oxidized to the corresponding metal oxide. In the preparation of titanium dioxide by vapor phase oxidation of titanium tetrahalide, titanium tetrahalides that typically have been utilized in such vapor phase oxidation reaction include titanium tetrachloride, titanium tetrabromide, titanium tetraiodide, and mixtures thereof. Titanium tetrachloride is economically preferred.

The oxygen-containing gas utilized to oxidize metal halides, such as titanium tetrahalide, can be substantially pure oxygen or a gaseous stream containing free or elemental oxygen. Examples thereof include: air, oxygen-enriched air, and oxygen mixed with the products of a combustible, such as carbon monoxide gas, a carbonaceous material or sulfur containing material. In addition, an oxidizing gas, such as the oxides of nitrogen, e.g., nitrous oxide, nitrogen dioxide, phosphorus, and hydrogen peroxide, can be used to furnish the oxygen.

The amount of oxygen supplied to oxidize the metal halide is usually stoichiometric, based on the metal halide, so as to convert all of the metal halide introduced to the corresponding oxide. Although greater or slightly less than stoichiometric quantities of oxygen can be employed, the amount of oxygen used usually ranges from 0.9 to 2.5 times that of stoichiometric quantities and preferably ranges from 1.0 to 1.5 moles of oxygen for each mole of metal halide fed to the reaction zone. More than stoichiometric amounts are provided to insure complete oxidation of the metal halide and other oxidizable components, such as metal halide additives, that are typically added to the reaction zone. It is economically desirable that the amount of oxygen employed be not greater than 10 percent above the stoichiometric amount. It is likewise desirable that complete reaction of the metal halide be accomplished because of the difficulty of handling a hot product stream containing substantial quantities of unreacted metal halide.

Often an inert gas is employed to protect exposed metal surfaces or to shroud the oxygen-containing stream from the metal halide (where the reactants are separately fed to the reaction zone) so as to prevent premature reaction of the reactants and encrustation of exposed metal surfaces with metal oxide. Such gases, therefore, can also be present in the reaction zone. Typical of such inert gases include: nitrogen, carbon dioxide, sulfur dioxide, chlorine, the noble gases, such as heilum, neon, argon, and krypton. Halogen gas, for example, chlorine, corresponding to the halide portion of the principal metal halide reactant, is preferred. Typically, the amount of inert gas fed to the reactor is in the order of from 0.01 to 200 mole percent, based on the moles of metal halide introduced. Preferably, inert gases are employed in amounts of between about 5 and about 100 mole percent.

The hot product stream resulting from the vapor phase oxidation reaction described hereinabove typically comprises a suspension of the finely-divided metal oxide in a gaseous stream comprising unreacted oxygen and metal halide, liberated halogen, combustion gases and other vaporous unreacted reactants or inert gases introduced into the reaction zone. The exact nature of the product stream composition is dependent upon the exact manner in which the oxidation reaction is performed. The product effluent stream is then typically cooled, the finely-divided metal oxide separated from the gaseous component of the reactor effluent and the metal oxide subjected to further processing.

In cooling the effluent stream exiting from the reactor, whether by indirect or direct heat exchange means, the effluent stream is typically conveyed through a conduit, usually a long or extended restricted conduit, during cooling. Plugging of this conduit by metal oxides dropping out of suspension is a particularly troublesome problem resulting from the use of such conduits. Attempts to alleviate the deposition or precipitation of the metal oxides within the conduit, such as by introducing abrasive solids, have not proven to be entirely satisfactory.

It has now been discovered that plugging of a conduit through which a product stream from the vapor phase oxidation of metal halides is conducted or passed can be substantially eliminated by selecting a conduit size, product stream linear velocity, and metal oxide loading so as to provide the product stream with a mass velocity of at least 30,000 pounds per hour per square foot (lbs./hr./ft.$^2$) at a solids loading of between about 0.1 and about 0.5 pound of solid per pound of gas. Advantageously, the mass velocity is greater than 30,000 lbs./hr./ft.$^2$, e.g., 35,000 lbs./hr./ft.$^2$, and has a solids loading of between about 0.1 and about 0.3 e.g., 0.2 to about 0.3. A preferred means for establishing the aforementioned mass velocity is to merge, mix, or combine the product effluent stream with an auxiliary gas stream at or near the reactor exit of the product effluent stream, advantageously within 0.3 second after the product effluent stream has been withdrawn from the reactor. The use of an auxiliary gas stream provides flexibility to the present process since when the rate of metal oxide production is reduced, the quantity of auxiliary gas used can be increased to maintain the mass velocity at the desired level.

The mass velocity of the gaseous stream containing entrained solids is defined herein as the number of pounds of solids and gas passing a given area in a unit of time. Preferably, the mass velocity of such stream through the conduit is at least 35,000 pounds per hour per square foot. Higher mass velocities are limited only by economic and engineering considerations. Thus, mass velocities over about 60,000 lbs./hr./ft.$^2$ are usually considered impractical. Moreover, the linear velocity of the stream at very high mass velocities, e.g., greater than 60,000 lbs./hr./ft.$^2$ can result in excessive acceleration of the stream around bends in the conduit and compaction of the entrained solids against the walls of the conduit, especially at bends therein.

The auxiliary gas stream which contacts, merges, mixes, and/or combines with the effluent product stream can be any gaseous stream that will not degrade the quality of the metal oxide product within the effluent stream. Typical of auxiliary gases which can be utilized for the aforementioned purpose include halogen gas, such as chlorine, air, nitrogen, carbon dioxide, sulfur dioxide, noble gases, such as argon, helium, neon, etc., and mixtures thereof. Of particular utility for this purpose is a gaseous stream such as a recycle stream comprising the gaseous portion of the product effluent stream. The use of such a stream promotes the use of a cyclic process. Thus, the product effluent stream is cooled, the metal oxide separated from the gaseous portion of the effluent, and the gaseous portion recycled to aid in establishing the required mass velocity and solids to gas loading ratio.

The temperature of the auxiliary gas stream can vary from ambient temperatures to the temperature of the product effluent. Typically, the temperature of the auxiliary gas stream will range from about 50° F. to about 400° F., and usually from about 100° F. to about 200° F. When the auxiliary gas stream is a recycle gas stream, the temperature of the auxiliary gas will typically be at or near the final temperature to which the product effluent gas stream is cooled.

The linear velocity of the auxiliary gas stream can range from about 25 to about 130 feet per second. The exact linear velocity selected will depend upon the velocity of the exiting product effluent stream since the combined product effluent and auxiliary gas stream velocities together with the conduit pipe size should be such as to produce a mass velocity of at least 30,000 pounds per hour per square foot. Preferably, the auxiliary gas stream will have a velocity in excess of the exiting product effluent stream in order to aid in the flow or emission of the product effluent stream from the reactor, such as by aspiration.

Figure 2:
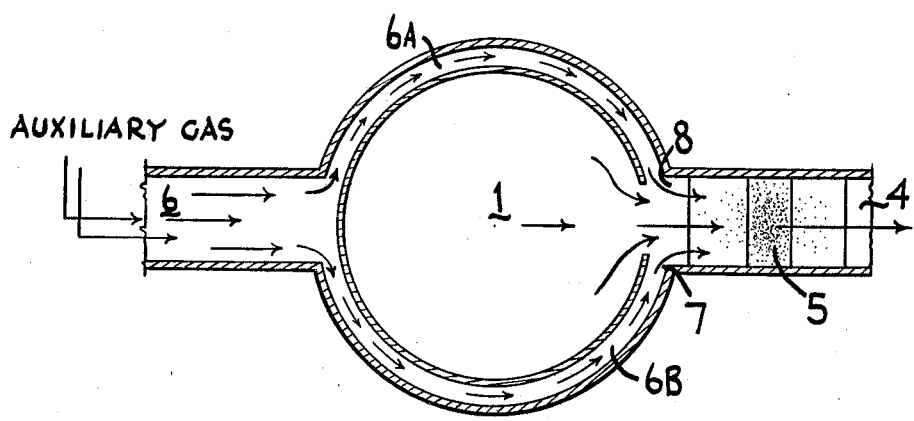
FIGURE 2 is a diagrammatic cross-sectional view taken along center line II—II of FIGURE 1.

Referring now to the drawings, there is shown in FIGURES 1 and 2 a portion of the lower section of an elongated cylindrical vapor phase oxidation reactor chamber 1 into which reactants are introduced, preferably through the top portion (not shown), as, for example, by means of a series of concentric tubes, such as disclosed in U.S. Patent 3,214,284.

At the bottom of reactor chamber 1 there is provided an opening 3 through which the effluent product stream exits from the reactor into conduit 4. A hopper 5 is shown externally to reactor 1 for the collection of non-pigmentary metal oxide particles which precipitate from the effluent product stream and for non-pigmentary metal oxide particles removed from the reactor.

Also external to reactor chamber 1 there is provided auxiliary gas conduit 6 which divides into conduits 6A and 6B, each of which encompasses the outside perimeter or circumference of reactor chamber 1.

Conduit 6A connects into conduit 4 at opening 8, and conduit 6B connects conduit 4 at opening 7.

Thus, an auxiliary gas stream supplied through conduit 6 splits into two streams which flow separately through conduits 6A and 6B and exit into conduit 4 through respective openings 8 and 7, thereby contacting and optionally cooling the effluent product stream exiting from reactor chamber 1 through opening 3. The mass velocity of the effluent product stream combined with that of the auxiliary gas stream and the size of conduit 4 are such so that the mass velocity of the combined streams is at least 30,000 pounds per hour per square foot and has a solids loading of between about 0.1 and about 0.5 pound of solid per pound of gas. Such mass velocity and solids loading insure that metal oxide particles, such as titanium dioxide, suspended in the effluent stream will have sufficient mass velocity to pass through the length of conduit 4 and subsequent processing equipment (not shown), for example, cooling equipment such as a trombone cooler and gas filters, without precipitating in significant quantities from the gas stream and obstructing such subsequent processing equipment. Significant precipitation of the suspended metal oxide results in the reduction of the cross-sectional area of the conduit by at least 25 percent, typically 50 percent or more. Conduit 4 or its extension is typically an extended length of pipe which, usually because of space considerations, is broken up into sections of straight pipe connected by 180° bends. When portions of conduit 4 are externally cooled, it is often referred to as a trombone cooler. The length of conduit 4 can range from several hundred feet to 3000 feet or more.

Figure 3:
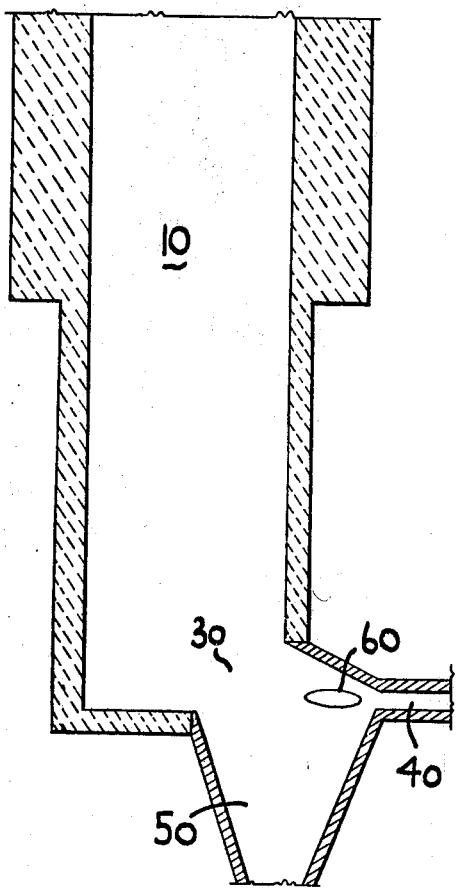
FIGURE 3 is a cross-sectional diagrammatic view of the lower section of a reactor, the initial portion of a conduit affixed to the reactor for conveying reactor effluent, a hopper, and an entry port for introducing auxiliary gas to the system.

In FIGURE 3, there is shown in diagrammatic vertical cross-section, the bottom portion of a reactor 10 with a hopper 50 provided at the bottom. The hopper is located partially in and partially without the reactor. In the upper portion of the hopper there is provided tangential port 60 through which an auxiliary gas is supplied in a direction leading away from the reactor exit 30 and toward conduit 40. Likewise, there may be provided an additional tangential port opposite to 60.

Figure 4:
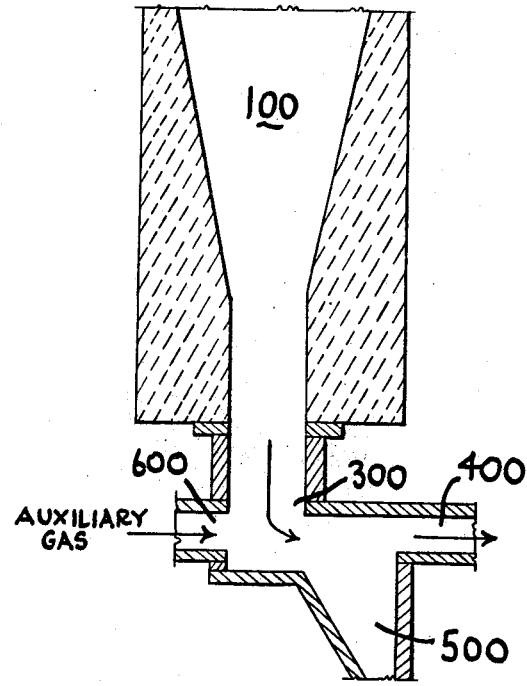
FIGURE 4 is a cross-sectional diagrammatic view of the lower section of a reactor, the initial portion of a conduit affixed to the reactor for conveying reactor effluent, a hopper, and a portion of a conduit for introducing auxiliary gas to the system.

In FIGURE 4, there is shown a diagrammatic vertical cross-section of the bottom of a reactor 100 from which the effluent product stream exits at 300 and is contacted by an auxiliary gas emitted from conduit 600, the merged streams continuing their combined path of flow through conduit 400 to subsequent process equipment. A hopper 500 is also shown.

Where the auxiliary stream has a higher linear velocity than the product effluent stream and is merged into the effluent stream close to the reactor exit, an aspirating or jetting effect is obtained, i.e., the auxiliary stream tends to educt the lower velocity product effluent from the reactor. Such an effect can be attained in the embodiments of FIGURES 1-4 by proper design of the mixing zone.

In FIGURES 1-4, conduits 4, 40, and 400 can merge directly into indirect heat exchange means such as conventional type tubular heat exchangers that employ gaseous or liquid coolants for passage in indirect heat exchange relationship with the gaseous suspension under treatment. The indirect heat exchange means can be the same size as conduits 4, 40, or 400, or can be larger or smaller than such conduits. Preferably, the indirect heat exchange means is the same size as the conduits 4, 40, or 400 or is smaller than such conduits. Although the gaseous or liquid coolant can be passed either internally or externally to the gaseous suspension under treatment, it is preferred that the gaseous or liquid coolant be passed externally to the gaseous suspension. Although any conventional gaseous or liquid heat exchange medium can be employed, water is typically used. It should be emphasized that the aforementioned indirect heat exchange means need not be used since all of the cooling of the gaseous effluent can be achieved by direct heat exchange with a heat exchange medium sufficiently cold to achieve the desired reduction in temperature of the product effluent so that the combined stream can be easily handled by subsequent processing equipment. Such a result, however, would require large quantities of a relatively cold heat exchange medium and is not considered to be economical. Typically, an auxiliary gas or any other conventional heat exchange medium utilized in the art for such direct heat exchange only partially cools or degrades the heat of the gaseous effluent stream. Further cooling is accomplished by indirect heat exchange means as discussed above.

Although the present invention is applicable generally to conveying metal oxides produced by the vapor phase oxidation of the corresponding metal halide through conduits, it can best be exemplified by the production of titanium dioxide by vapor phase oxidation of titanium tetrahalide. Conveying of hot gaseous suspensions of titanium dioxide are particularly troublesome due to the propensity of this metal oxide to deposit in conduits utilized for this purpose and thereby obstruct the free flow of gaseous reactants. It has been suggested that this propensity is caused by the sticky or elastic nature of titanium dioxide at very high temperatures. Another suggested reason for this tendency to deposit and plug the conduit is the electrostatic properties of such particles.

In the production of pigmentary titanium dioxide by vapor phase oxidation of titanium tetrahalides, such as titanium tetrachloride, the effluent product stream exiting from the reactor contains pigmentary titanium dioxide, unreacted titanium tetrachloride and oxygenating gas, liberated chlorine, and possibly other gases, such as argon, nitrogen, helium, krypton, xenon, hydrogen chloride, or mixtures of same, particularly where processes taught by U.S. Letters Patent 3,069,281 or U.S. Letters Patent 3,068,113 are conducted. In addition, the effluent stream can contain combustion products such as carbon dioxide and sulfur-containing compounds, when the combustion of carbon monoxide, carbonaceous materials, sulfur-containing compounds, or other fuels are employed as a means of supplying heat to the reaction zone. See, for example, U.S. Patent 3,105,742.

Moreover, the effluent stream can contain coarse, non-pigmentary metal oxide particles formed by unhindered metal oxide growth, and scale or encrustations formed on the walls of the reactor chamber. Since these coarse, non-pigmentary particles are heavier and more dense than the effluent product stream and the pigmentary titanium dioxide, they settle by gravity from the stream and are collected within a hopper or other collecting arrangement usually positioned near the bottom of the reactor chamber or at a point external to the reactor immediately adjacent to the exit opening in the reactor.

Typically, the effluent product stream is emitted from the reactor at temperatures of from about 1800° F. to about 2500° F. and cooled by direct or indirect heat exchange means. Where, for example, an auxiliary gas stream, at temperatures of from about 50° F. to about 400° F., is admixed with the product effluent stream, the effluent stream is typically cooled to a temperature of about 1600° F. Additional cooling is achieved by means of indirect heat exchange means so that the product effluent stream is eventually cooled to below about 100° F.

When the auxiliary gaseous stream is a recycle stream, it typically comprises liberated halogen, e.g., chlorine, small amounts of titanium tetrahalide and oxygen, and other gases depending upon the original composition of the effluent stream. The recycle stream preferably does not contain titanium dioxide particles. The metal oxide is usually effectively removed by filtering or other separation steps subsequent to cooling and before recycling. The auxiliary stream, as previously discussed, can also be from a source entirely independent of the reactor system.

In the preferred embodiment of this invention, an auxiliary gas stream is merged with the effluent product stream at a point outside of the reaction chamber. If the streams are merged internally within the reaction chamber, reaction zone conditions can be upset. For example, if a lower temperature auxiliary gas stream is used, it can lower the reaction zone temperature and hinder the effective formation of pigmentary titanium dioxide. Even if the auxiliary stream is at a location somewhat removed from the reaction zone, for example, at the bottom of the reactor, the reaction zone may still be cooled by a backdraft of a cooler auxiliary stream up into the reactor. Accordingly, in the preferred embodiment, the two streams are merged at a point external of the reaction chamber and preferably at a location immediately adjacent the exit of the effluent gas stream from the chamber. Although it is desirous to introduce an auxiliary gas stream in a split flow, that is, merging with the effluent gas stream at two opposite points, it is equally possible to merge the streams at one point as well as a series of points.

The ratio of the mass velocity of the auxiliary gaseous stream to the mass velocity of the effluent product stream can range from about 0.2 to 12.0, and preferably range from about 2.0 to about 5.0. The linear and mass velocities of each stream are calculated from the length and cross-sectional area of the conduit through which the gaseous streams are conveyed.

The combined gaseous stream of auxiliary gas plus effluent product should have a linear velocity of about at least 25 to 30 feet per second and preferably will have a linear velocity of at least 45 feet per second. Velocities up to about 135 feet per second are contemplated. The average mass velocity of the combined streams should be at least about 30,000 pounds per hour per square foot and preferably at least 35,000 pounds per hour per square foot.

When the auxiliary stream is a recycle stream, it will have approximately the same composition as that of the effluent gas and have approximately the same average molecular weight. In the case of the production of titanium dioxide by vapor phase oxidation of titanium tetrachloride, such molecular weight will have a molecular weight range of from 55 to 71, usually 67 to 70.

The pigmentary metal oxides prepared by the vapor phase oxidation of the corresponding metal halide can be utilized for any application, requiring finely-divided metal oxides of the type produced. The pigmentary metal oxides, especially the pigmentary white metal oxides, have extensive applications in the paint, paper, and printing industries.

The present process is more particularly described in the following examples which are intended as illustrative only since numerous modifications and variations therein will be apparent to those skilled in the art.

EXAMPLE I

The process equipment of FIGURE 3 was employed. Thirty-five (35) gram-moles per minute of titanium tetrachloride preheated to about 800° F. was introduced into the upper portion of reactor 10. Simultaneously, 44.7 gram-moles per minute of oxygen preheated to a temperature sufficient to provide an average reaction temperature of about 2000° F. and about 22 gram-moles per minute of chlorine were introduced into the reactor. About 905 pounds per hour of gaseous effluent and 375 pounds per hour from the reactor at a temperature above 1500° F.

A recycled reactor exit gas stream at a temperature of about 142° F. and in an amount of about 782 pounds per hour was merged with the product effluent stream after the product stream had left the reactor. The resulting combined stream was then forwarded through a conduit comprising about 35 feet of four-inch jacketed nickel pipe, about 176 feet of six-inch nickel pipe, 82 feet of five-inch aluminum pipe, and about 200 feet of four-inch aluminum pipe. Additional cooling of the combined stream was accomplished by flowing ambient water over the outside of the conduit.

The solids loading of the combined stream was about 0.22 pound of titanium dioxide per pound of gas. The mass velocity of the combined stream, based on the effective diameter of the four-inch jacketed pipe was about 30,700 pounds per hour square foot. The reactor was run continuously for an extended period of time without plugging in the four-inch jacketed pipe. The reactor was then shut down for other reasons.

EXAMPLE II

The procedure of Example I was employed except that the amount of recycle reactor exit gas was reduced to about 50 percent of that used in Example I. The calculated solids loading through the conduit was found to be about 0.29 pound of titanium dioxide per pound of gas. The mass velocity of the combined stream based on the effective diameter of the four-inch jacketed pipe was about 29,800 pounds per hour square foot. A radiation gage employing a radioactive cesium source attached to the four-inch jacketed pipe indicated that the pipe filled about half-way with deposited titanium dioxide and thus created a potential plugging hazard. When the previous level of recycle gas was restored, the system returned to the conditions established prior to the reduction in recycle gas flow.

EXAMPLE III

In a manner analogous to, and using the equipment of, Example I, a combined stream of titanium dioxide reactor effluent and recycle reactor exit gas was conducted through the conduit described in Example I. The solids loading of the combined stream was calculated to be about 0.11 pound of titanium dioxide per pound of gas and the mass velocity based on the effective diameter of the six-inch nickel pipe calculated to be about 24,000 pounds per hour square foot. Settling of the titanium dioxide in the conduit was found to occur. When the mass velocity of the combined stream is raised to about 30,000 pounds per hour square foot, no settling is observed.

EXAMPLE IV

In a manner analogous to, and using the equipment of, Example I, a combined stream of titanium dioxide reactor effluent and recycle reactor exit gas is conducted through the conduit described in Example I. The solids loading of the combined stream is calculated to be about 0.4 pound of titanium dioxide per pound of gas. The mass velocity of the combined stream is maintained at 30,000 pounds per hour square foot and at higher levels, e.g., 35–40,000 pounds per hour square foot. No plugging of the conduit at any of the mass velocity levels is found to occur.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. A process for conveying a gaseous stream containing suspended pigmentary titanium dioxide through a conduit without significant deposition of said titanium dioxide, which comprises conveying said gaseous stream through the conduit at a mass velocity of at least 30,000 pounds per hour square foot and a solids loading of from 0.1 to about 0.5 pound of titanium dioxide per pound of gas.

2. A process according to claim 1 wherein the mass velocity ranges from 30,000 lbs./hr./ft.$^2$ to 60,000 lbs./hr./ft.$^2$ and the solids loading ranges from 0.1 to about 0.3 pound of titanium dioxide per pound of gas.

3. A process for conveying and cooling a gaseous stream containing suspended pigmentary titanium dioxide through an externally cooled conduit without plugging of the conduit with deposited titanium dioxide, which comprises conveying said gaseous stream through the conduit at a mass velocity of at least 30,000 pounds per hour square foot and a solids loading of from 0.1 to about 0.3 pound of titanium dioxide per pound of gas.

4. In a process for producing pigmentary titanium dioxide by vapor phase oxidation of titanium halide within a reactor at elevated temperatures wherein a gaseous effluent product stream containing suspended titanium dioxide is withdrawn from the reactor and conveyed through a conduit, the improvement which comprises conveying reactor effluent through the conduit at a mass velocity of at least 30,000 pounds per hour square foot and a solids loading of from 0.1 to about 0.5 pound of titanium dioxide per pound of gas.

5. In a process for producing pigmentary titanium dioxide by vapor phase oxidation of titanium tetrahalide selected from the group consisting of titanium tetrachloride, titanium tetrabromide and titanium tetraiodide within a reactor at temperatures above 500° C., wherein a gaseous effluent product stream containing suspended titanium dioxide is withdrawn from the reactor and conveyed through a tubular heat exchanger, the improvement which comprises conveying such reactor effluent through the tubular heat exchanger at a mass velocity of at least 30,000 pounds per hour square foot and a solids loading of from 0.1 to about 0.5 pound of titanium dioxide per pound of gas to thereby avoid substantial deposits of suspended solids in the heat exchanger.

6. A process according to claim 5 wherein the mass velocity ranges from 30,000 lbs./hr./ft.$^2$ to 60,000 lbs./hr./ft.$^2$ and the solids loading ranges from 0.1 to about 0.3 pound of titanium dioxide per pound of gas.

7. In a process for producing pigmentary titanium dioxide by vapor phase oxidation of titanium halide within a reactor at elevated temperatures wherein gaseous effluent product containing suspended titanium dioxide product is withdrawn from the reactor, admixed with auxiliary gas and the resulting mixture conveyed through a conduit, the improvement which comprises conveying the resulting mixture through the conduit at a mass velocity of at least 30,000 lbs./hr./ft.$^2$ and a solids loading of from 0.1 to about 0.5 pound of titanium dioxide per pound of gas.

8. A process according to claim 7 wherein the auxiliary gas is recycled gaseous product effluent.

9. A process according to claim 7 wherein the mass velocity ranges from 30,000 lbs./hr./ft.$^2$ to 60,000 lbs./hr./ft.$^2$ and the solids loading ranges from 0.1 to about 0.3 pound of titanium dioxide per pound of gas.

10. A process according to claim 7 wherein said conduit is externally cooled.

References Cited

UNITED STATES PATENTS

| | | | |
|---|---|---|---|
| 2,789,886 | 4/1957 | Kraus | 23—202 |
| 2,791,490 | 5/1957 | Willcox | 23—202 |
| 3,078,148 | 2/1963 | Belknap | 23—202 |
| 3,322,499 | 5/1967 | Carpenter | 23—293 X |
| 3,406,012 | 10/1968 | Rohn | 23—202 |

FOREIGN PATENTS 567,185  12/1958  Canada.

NORMAN YUDKOFF, Primary Examiner

S. J. EMERY, Assistant Examiner

U.S. Cl. X.R.

23—202; 55—71; 106—300; 302—17